United States Patent
Edsall et al.

(10) Patent No.: US 9,421,461 B2
(45) Date of Patent: Aug. 23, 2016

(54) PLAYER AVATAR MOVEMENT ASSISTANCE IN A VIRTUAL ENVIRONMENT

(71) Applicant: MICROSOFT TECHNOLOGY LICENSING, LLC, Redmond, WA (US)

(72) Inventors: Gerald Edsall, British Columbia (CA); Athomas Goldberg, New Westminster (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 17 days.

(21) Appl. No.: 14/141,262

(22) Filed: Dec. 26, 2013

(65) Prior Publication Data

US 2015/0182854 A1 Jul. 2, 2015

(51) Int. Cl.
| | |
|---|---|
| A63F 9/24 | (2006.01) |
| A63F 13/30 | (2014.01) |
| A63F 13/422 | (2014.01) |
| A63F 13/577 | (2014.01) |

(52) U.S. Cl.
CPC .............. *A63F 13/12* (2013.01); *A63F 13/422* (2014.09); *A63F 13/577* (2014.09)

(58) Field of Classification Search
USPC ..................................................... 463/31–42
See application file for complete search history.

(56) References Cited

U.S. PATENT DOCUMENTS

| | | | |
|---|---|---|---|
| 5,287,446 A | | 2/1994 | Williams et al. |
| 5,616,031 A | * | 4/1997 | Logg ..................... A63F 13/005 345/426 |
| 6,196,917 B1 | * | 3/2001 | Mathias ................. A63F 13/10 463/2 |
| 2002/0115483 A1 | * | 8/2002 | Fujiwara ................ A63F 13/10 463/7 |
| 2005/0071306 A1 | * | 3/2005 | Kruszewski ............ A63F 13/10 706/47 |
| 2009/0311652 A1 | * | 12/2009 | Langridge .............. G09B 19/00 434/11 |
| 2010/0004861 A1 | | 1/2010 | Park |
| 2010/0009733 A1 | | 1/2010 | Garvin et al. |
| 2010/0009734 A1 | * | 1/2010 | Sambongi ............... A63F 13/10 463/5 |
| 2010/0146085 A1 | * | 6/2010 | Van Wie ................. A63F 13/12 709/220 |
| 2010/0315505 A1 | | 12/2010 | Michalke |
| 2011/0009241 A1 | * | 1/2011 | Lane ..................... G06K 9/00342 482/8 |
| 2011/0039618 A1 | * | 2/2011 | Ichiyanagi .............. A63F 13/10 463/31 |
| 2011/0077080 A1 | * | 3/2011 | Meer ....................... A63F 13/12 463/32 |

(Continued)

OTHER PUBLICATIONS

Steinicke, et al., "Real Walking through Virtual Environments by Redirection Techniques," Journal of Virtual Reality and Broadcasting, vol. 6, No. 2 (2009), Retrieved from: https://wwwpsy.uni-muenster.de/imperia/md/content/psychologie_institut_2/ae_lappe/freie_dokumente/steinicke_jvrb2009.pdf, Retrieved Date: Jul. 23, 2013 (16 pages total).

(Continued)

*Primary Examiner* — Masud Ahmed
(74) *Attorney, Agent, or Firm* — Aaron Chatterjee; Judy Yee; Micky Minhas

(57) ABSTRACT

Systems and methods are provided to implement a predictive avoidance algorithm, or "locomotion assist", to help players maneuver player avatars to avoid collisions, as well as to occupy cover positions. A level of partial system control is exerted to subtly guide player avatars so as to navigate virtual environments, such as towards points of interest or away from obstacles. In this way, a user can navigate a 3-D environment more easily. Ways to decipher a user intent are disclosed, and the same may be employed in the application or removal of partial system control.

19 Claims, 11 Drawing Sheets

(56) References Cited

U.S. PATENT DOCUMENTS

| | | | | |
|---|---|---|---|---|
| 2011/0244957 A1* | 10/2011 | Nishimura | ............... | A63F 13/10 463/31 |
| 2011/0269540 A1* | 11/2011 | Gillo | ................ | A63F 13/00 463/31 |
| 2013/0178980 A1 | 7/2013 | Chemouny | | |
| 2013/0293362 A1* | 11/2013 | Parazynski | ............ | G08C 19/16 340/12.52 |

OTHER PUBLICATIONS

Jacobs, et al., "Robust Collision Avoidance in Unknown Domestic Environment," Book RoboCup 2009, Springer-Verlag Berlin, Heidelberg (2009), Retrieved from: http://www-kbsg.informatik.rwth-aachen.de/fileskbsg/robocup2009colli.pdf, Retrieved Date: Jul. 23, 2013 (12 pages total).

Subramanian, et al., "dSPACE DS-1104 based Real-Time Verification of 3D Collision Avoidance for Autonomous Underwater Vehicles," dSPACE User Conference 2012: Published Date: Sep. 14, 2012, Retrieved from: http://www.dynafusiontech.com/pdf/dSPACE%20HIL%20Setup%20for%20Real-Time%20-Verification%20of%203D%20Collision%20Avoidance%20for%20Autonomous%20Underwater%20Vehicles_IIT.pdf (8 pages total).

Pettr, et al., "D Collision Avoidance for Digital Actors Locomotion," Intelligent Robots and Systems, 2003. (IROS 2003). Proceedings. 2003 IEEE/RSJ International Conference (vol. 1 ), Published Date: Aug. 27, 2003, Retrieved from: http://ieeexplore.ieee.org/stamp/stamp.jsp?tp=&arnumber=1250661 (6 pages total).

"International Search Report and Written Opinion Issued in PCT Patent Application No. PCT/US2014/068681", Mailed Date: Jul. 6, 2015, (17 Pages total).

"Second Written Opinion Issued in PCT Application No. PCT/US2014/068681", Mailed Date: Dec. 9, 2015, (4 Pages total).

"International Preliminary Report on Patentability Issued in PCT Patent Application No. PCT/US2014/068681", Mailed Date: Mar. 18, 2016, 9 Pages.

\* cited by examiner

PLAYER AVATAR MOVEMENT ASSISTANCE IN A VIRTUAL ENVIRONMENT

CROSS REFERENCE TO RELATED APPLICATIONS (None.)

BACKGROUND

Avoiding near collisions while navigating in a 3-D environment with a game controller can be difficult for players. Players, or more precisely player avatars, can easily collide into objects that they did not intend to hit because of the inherent inaccuracies of movement. Often games will implement a "collide and slide" algorithm, paired with the world geometry of the online environment, that is used to prevent player avatars from being stuck or hung up on these collisions. Such solutions are inefficient as player avatar motion is still interrupted and slowed, which deleteriously reduces the player's feeling of being in control.

The difficulties above are accentuated with the use of a third person camera, especially with a camera offset. Players will often subconsciously ignore the character avatar and drive their desired direction through an aiming reticule or based on the center of the screen. In these cases, the character model will collide more often than before, as the reticule offset from the avatar will make it appear that a user can pass an obstacle, when in actuality the player avatar is lined up to strike the obstacle while the player camera, the view seen by the player, is not.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Arrangements according to present principles implement a predictive avoidance algorithm, or "locomotion assist", to help players maneuver their player avatars to avoid collisions, as well as to occupy cover positions. A level of partial system control is exerted to subtly guide player avatars so as to navigate virtual environments, such as towards points of interest or away from obstacles. In this way, a user can navigate a 3-D environment more easily. Consideration may be taken to decipher a user's intent and to use the same to dynamically apply or remove partial system control.

In certain arrangements, the player maintains a degree of control over the player avatar. The arrangements are tunable based on the environment of the situation. For example, the same may be tuned for fast-moving environments or slow-paced environments. The arrangements may also be tunable based on game context. The tuning may be performed to ensure the effect is subtle, and increases accessibility without taking away player control. Designers may employ the arrangements to help player avatars move more easily through doors and around obstacles without the user being required to perform precise fine motor control or to have precise awareness of the environment. The partial system control also helps players to control their avatars to consistently reach or avoid cover locations, preventing undesirable partial cover scenarios.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

Like reference numerals refer to like elements throughout. Elements are not to scale unless otherwise noted.

DETAILED DESCRIPTION

Figure 1:
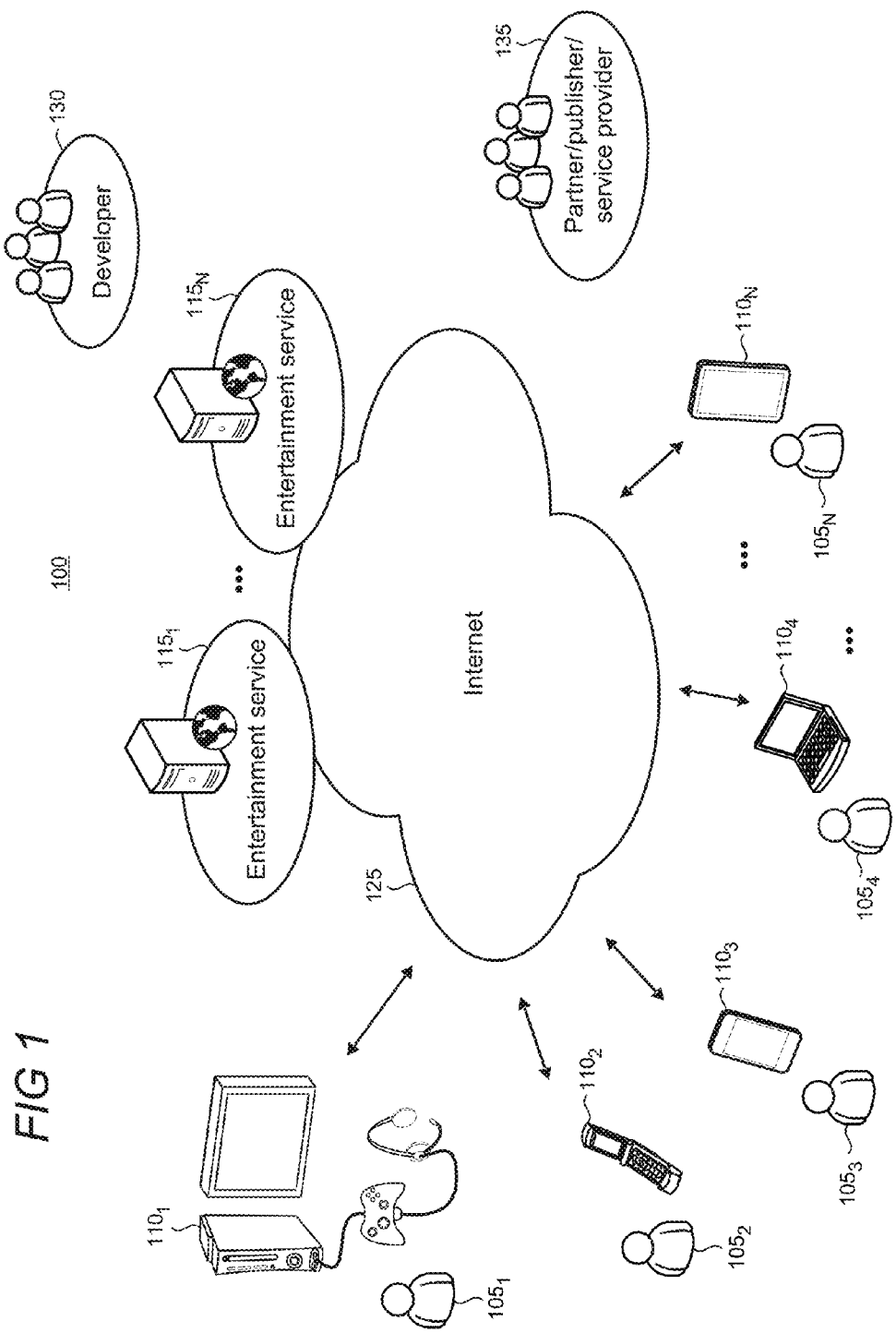
FIG. 1 shows an illustrative computing environment in which the present player avatar movement assistance may be implemented.

FIG. 1 shows an illustrative computing environment 100 in which the present player avatar movement assistance may be implemented. Users 105 of a variety of client computing platforms 110 such as multimedia consoles, mobile phones, smartphones, tablets, personal computers ("PCs"), personal digital assistants ("PDAs"), handheld gaming platforms, personal media players, wearable computers, navigation devices, and the like, which can consume and/or render media content, may interact with one or more entertainment services $115_1 \ldots _N$ over a network such as the Internet 125. Various other partners, publishers, and/or service providers may also be present in the computing environment 100, e.g., within the cloud, as representatively indicated by reference numeral 135.

Figure 2:
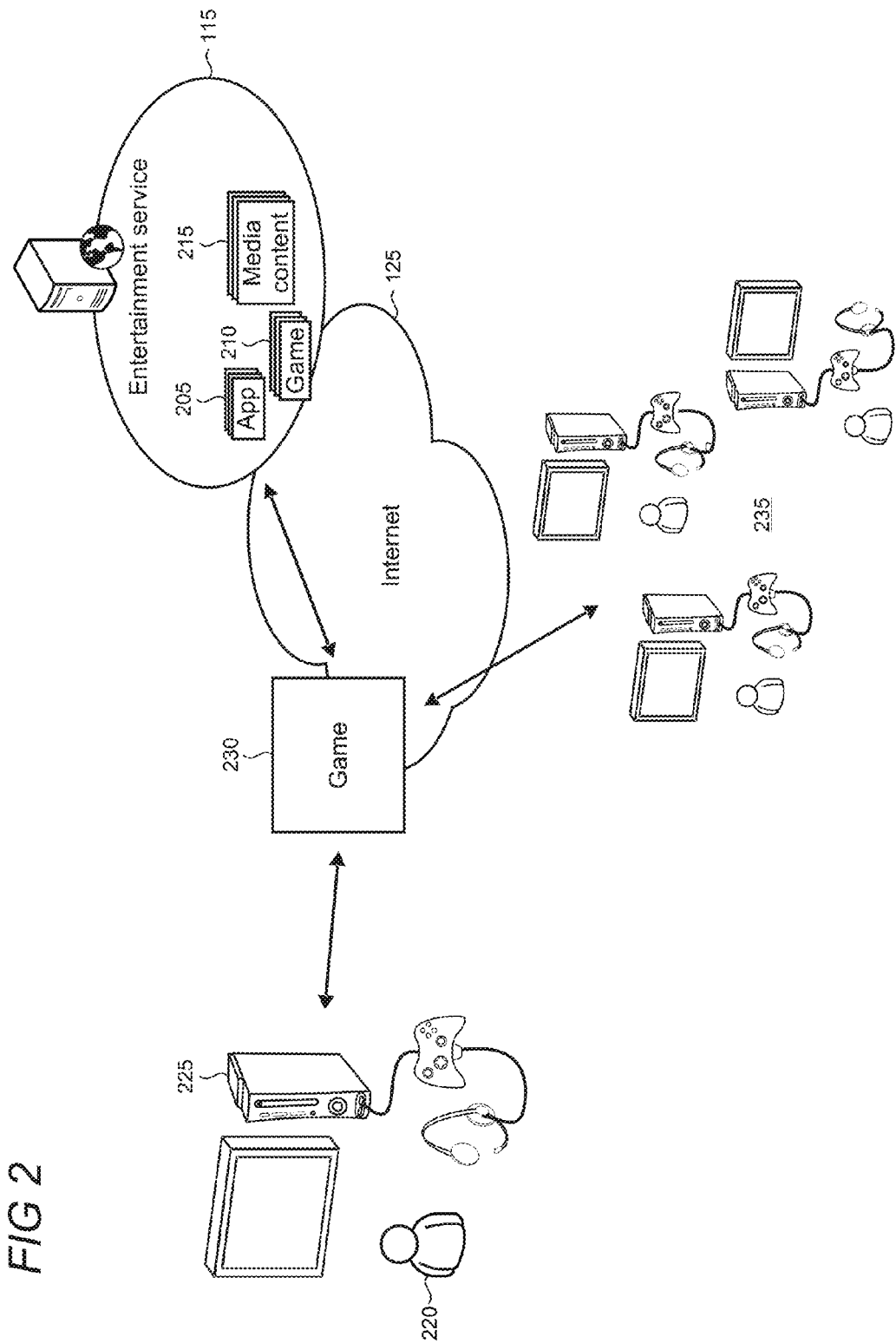
FIG. 2 shows a game that is played in a computing environment.

As shown in FIG. 2, an entertainment service 115 can typically expose applications ("apps") 205, games 210, and media content 215 to a player 220 of a multimedia console 225. It will be appreciated that games may be viewed as a particular type of app.

In an illustrative example shown in FIG. 2, the user plays a particular game 230. The game 230 may execute locally on the multimedia console, be hosted remotely by the entertainment service 115, or use a combination of local and remote execution in some cases. The game 230 may also be one in which multiple other players 235 can participate. It will be appreciated that multi-player gaming is often typically supported on other computing platforms such as smartphones and PCs.

In such gaming environments it is common that player avatars move and interact within an online environment. In doing so, they commonly move throughout a complicated 3-D environment, performing quests, interacting, performing combat, and the like. While performing complex movement and actions while simultaneously performing other functions can be satisfying to a player, encountering movement difficulties within the environment is not, e.g., inadvertently colliding with small obstacles may be frustrating.

In the situation illustrated in FIGS. 3(A) and 3(B), a player avatar 252 is under control of a user or player (not shown) towards an obstacle which has been identified within the system as an avoidance zone 258. Avoidance zones are generally volumes or areas within the online environment with which it is undesirable for a player avatar to collide, e.g., as a player avatar may have trouble moving away from such zones because of the geometry of the environment. Such are discussed in greater detail below.

A user generally controls a position and motion of the player avatar 252 by entering user input, such as on a joystick or controller. Control of the motion of the player avatar 252 generally controls the position of the same, although it will be understood that player avatar positions may also be altered in ways not specifically related to movement, e.g., by passage through portals in the game environment and the like.

The player avatar 252 is illustrated with a player position 254 and a player motion or movement direction 256. The player motion generally refers to the movement of the player avatar, e.g., a computer model having a size, shape, texturing, and the like, in the online environment. The movement direction 256 is associated with the motion, but is more directed towards a vector quantity relating to the direction the player avatar 252 is moving. If the movement direction 256 is further associated with a speed of the player avatar, e.g., having a length proportional thereto, than the resultant vector is simply a basic velocity vector.

In certain arrangements according to present principles, the movement of the player avatar as controlled by the player is enhanced by an additional partial level of control exerted by the system, where the enhancement or added control alters the movements of the player avatar away from certain volumes or objects identified as avoidance zones, such being termed the player avatar movement assistance.

In some applications, the speed of movement of the player avatar within the online environment may have a bearing on the player avatar movement assistance. For example, if a player avatar is moving within the online environment at a high rate of speed, any alterations of its direction of movement, so as to not collide with the avoidance zones, may be required to occur more quickly, or the same may entail larger and less subtle alterations in the direction of movement. The same may also require that alterations in direction occur at a point when the player avatar is farther from the avoidance zone than in an equivalent situation where the player avatar is moving slowly. Conversely, slower moving player avatars may have more subtle partial system control exerted to avoid the same collision.

Figure 3:
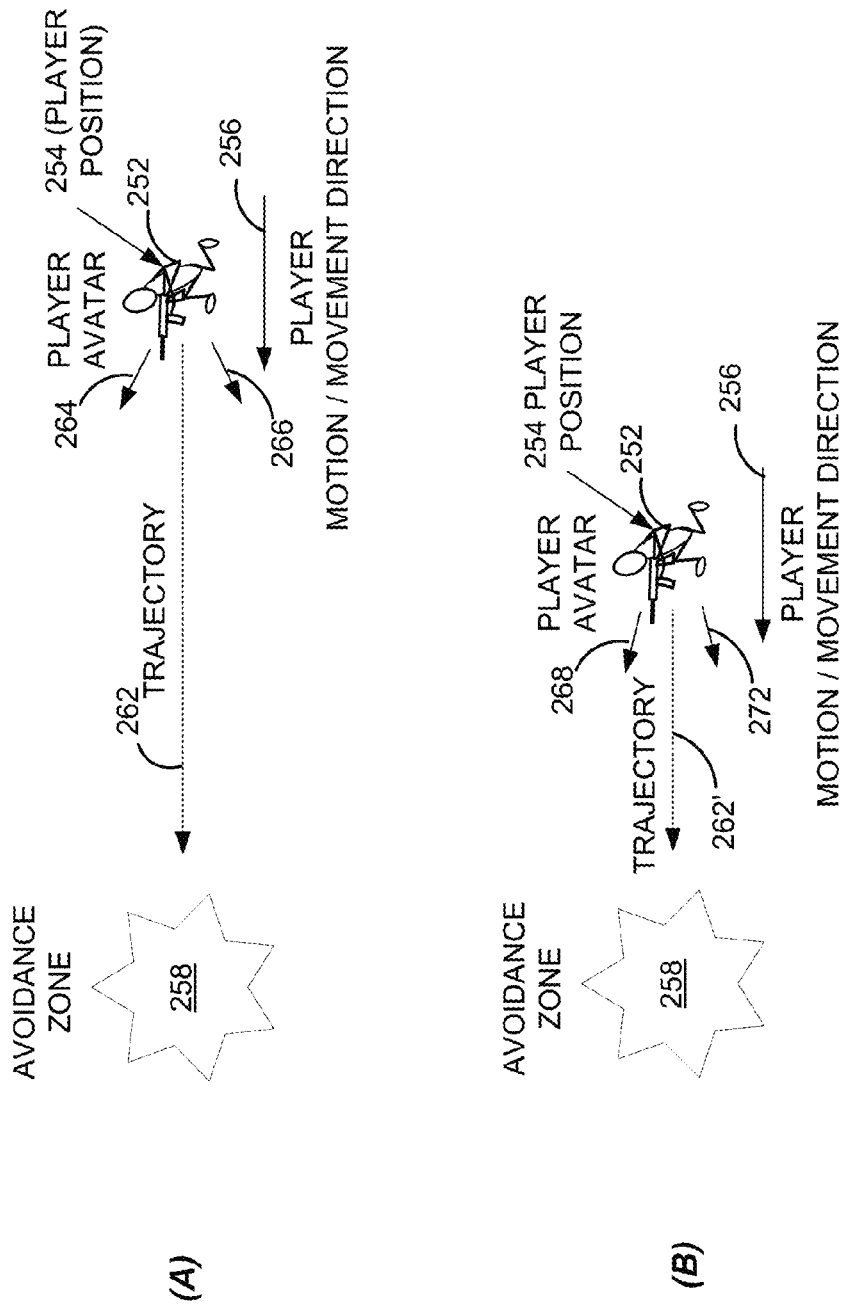
FIGS. 3(A) and 3(B) illustrate an exemplary situation in which an arrangement of the system and method according to present principles may be implemented.

In FIG. 3 (A), the player avatar 252 is moving towards the avoidance zone 258, and a calculated trajectory 262 is illustrated. Analysis of the trajectory 262 leads to the determination of a potential collision between the player avatar 252 and the avoidance zone 258. In FIG. 3 (A), the player avatar 252 is a certain distance from the avoidance zone 258. In FIG. 3 (B), the player avatar 252 is closer to the avoidance zone 258 than in FIG. 3 (A) (see trajectory 262'). Thus, in some implementations the system may infer that the user controlling the movement of the player avatar 252 is intending that the player avatar 252 be close to or even strike the avoidance zone 258. Accordingly, the amount of alteration of motion or movement direction may accordingly be less in FIG. 3 (B) than in FIG. 3 (A). Such is shown in FIG. 3 by vectors illustrating such alterations in motion or movement direction, which generally cause alterations in data associated with the movement direction of the player avatar, e.g., an addition or subtraction of a movement angle, an addition or subtraction applied to a coordinate representing position, or the like. In FIG. 3 (A) such are illustrated by vectors 264 and 266, which represent partial system control exerted, in addition to the user control of the player avatar, to subtly move the player avatar 252 around the avoidance zone 258. In accordance with the description above, the vectors 264 and 266 from FIG. 3 (A) illustrate greater control than equivalent vectors 268 and 272 from FIG. 3(B), since the player avatar 252 is closer to the avoidance zone 258 in FIG. 3 (B) than in FIG. 3 (A). These aspects are further discussed below in reference to FIG. 6.

FIGS. 4(A)-4(C) illustrate exemplary steps in collision prediction and avoidance. In these figures, the player avatar 252 is moving towards an obstacle 274 in which an avoidance zone 280 has been identified. Also shown is a controller 276 having one or more ways in which a user may enter data appropriate to control the position and motion of the player avatar 252. In the controller 276, such as a stick 278.

Figure 4:
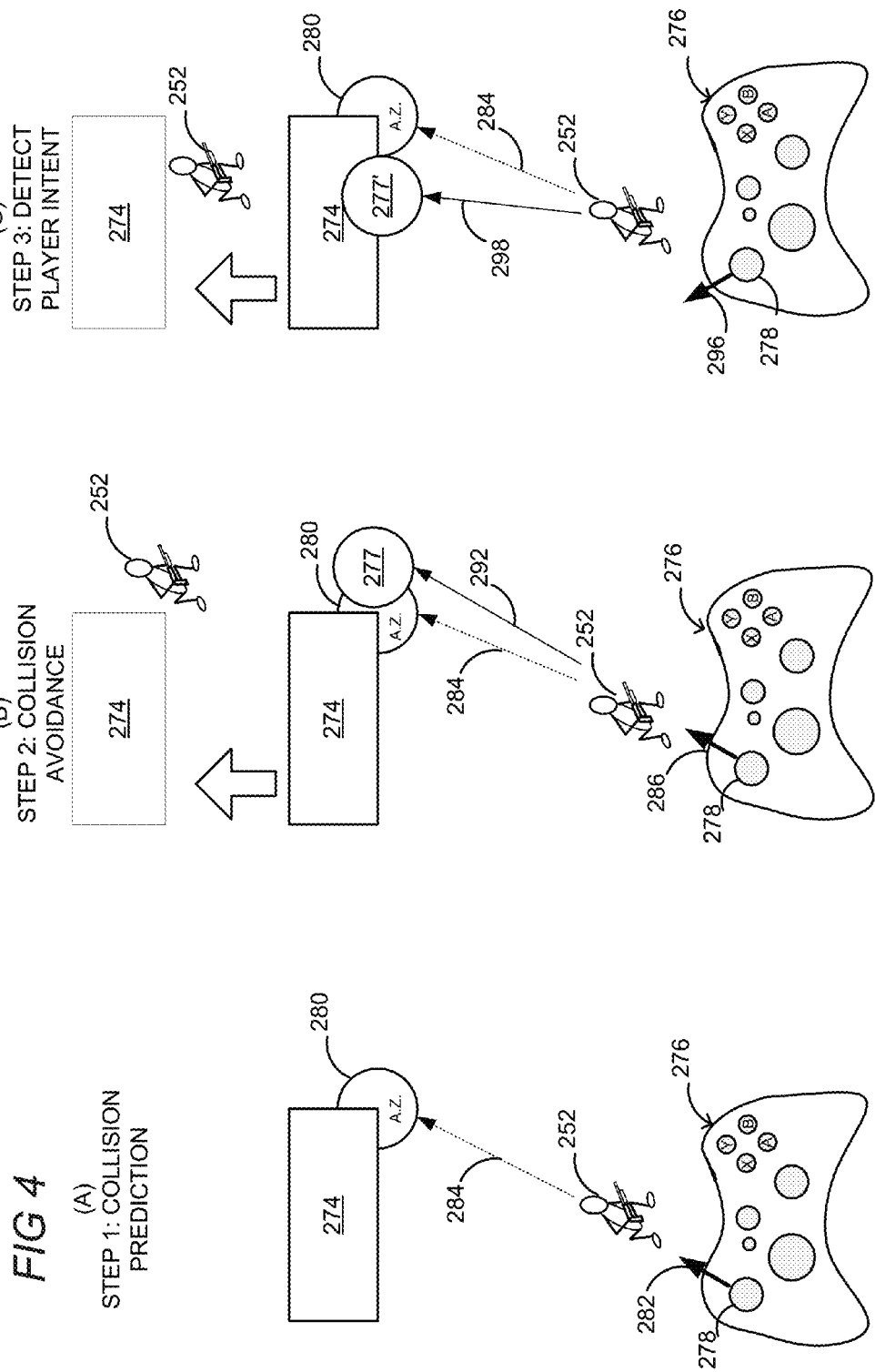
FIGS. 4(A)-4(C) show another situation in which an arrangement of the system and method according to present principles may be implemented, this arrangement illustrating three exemplary steps in a method for player avatar movement assistance.

Referring to FIG. 4 (A), a user is controlling the movements of the player avatar 252 by moving the stick 278 in a direction 282 which leads the player avatar 252 to have a trajectory 284 which is calculated to collide or intersect with the avoidance zone 280. In general, in this first (collision prediction) step, the motion of the player avatar is predicted against the online environment, e.g., the 3-D scene of a game. Motion prediction predicts a trajectory of the player position ahead in time against what is known in the environment. In particular, a determination is attempted as to whether the player avatar is moving into an undesirable collision.

In many cases, scene markup in online environments, or other such map data, may be employed to provide systems and methods according to present principles with information about "cover" and "avoidance" locations. These are generally associated with zones such as areas or volumes according to the level. Cover locations define locations in which the player avatar can hide from enemies. In such locations, player avatars generally suffer no or greatly-reduced damage. Edges or extremities of cover positions are of particular interest, as players generally only want to be fully in-cover or fully out-of-cover. Being half in cover at the edge is undesirable.

Avoidance zones are generally areas for which collisions with player avatars are undesired, e.g., such as pillars or small obstacles. While it is important for realism to have player avatars move around or over such avoidance zones, rather than through the same, being stuck or "hung up" on such locations can be frustrating for players. For example, in FIG. 4 (A), while a player may desire their player avatar 252 to be behind the obstacle 274, or to go around the same, a player would find it frustrating to have their player avatar 252 be hung up at the edge of the obstacle 274, and thus an avoidance zone 280 is identified and constructed at such edge. In the case of FIG. 4 (A), the trajectory 284 of the player avatar 252 is such that the same will intersect the avoidance zone 280, and thus a collision is predicted.

Methods of collision prediction are generally known. Here it is noted that the collision prediction as between a player avatar and an avoidance zone may include factors such as whether the calculated trajectory of the player avatar intersects with the avoidance zone, the degree of intersection, the size of the CG model corresponding to the player avatar, and the like. Generally an undesirable collision is one that occurs with an identified avoidance zone, as opposed to collisions with other obstacles not so identified, although other definitions of undesirable conditions will also be understood. Avoidance zones may be identified manually, by the map designer, or such may be automatically detected and identified by an algorithm which analyzes obstacles for such potential zones.

Once an undesirable collision is predicted, a degree of partial system control may be exerted (in the second step) to adjust the player avatar direction towards one or more other directions that will avoid the collision. In many cases, avoidance of the collision with the avoidance zone will be via the player avatar moving to the right or the left around the avoidance zone. While in many cases the resolution of how to avoid or move around the avoidance zone will be based on the geometry and/or location of the zone and the direction of movement of the player avatar, in some cases the speed of the player avatar and the CG model of the player avatar may also be considered. Moreover, in other implementations, the facing direction of the camera may also be employed. For example, if the player causes the camera to face in one direction of collision avoidance, that direction may be given preference if two potential directions of collision avoidance are possible, as it may be presumed that the camera-facing direction was the one in which the player was intending to pursue.

In the case of a player avatar attempting to access or occupy a position of cover, a degree of partial system control may be exerted on the movement of the player avatar, such that the same is caused to be fully in-cover or fully avoiding the cover. In one specific implementation, if the system determines that a player is attempting to have their player avatar avoid a cover position, the cover position, or a volume associated therewith, may be treated at least temporarily as an avoidance zone.

Figure 6:
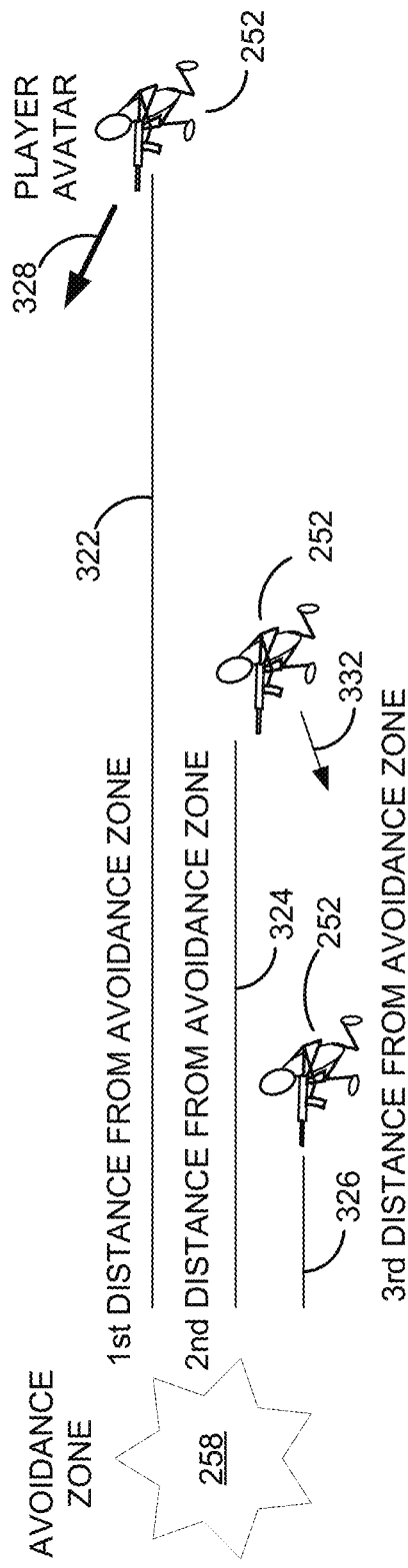
FIG. 6 illustrates another exemplary situation in which an arrangement of the system and method according to present principles may be implemented.

The control adjustment, which may be manifested as partial system control of player avatar motion, subtly adjusts the player avatar motion to a new course or trajectory, e.g., to be deflected away from the avoidance zone. Such may be performed well in advance of the collision, so the net effect is very subtle to the user. Usually only a few degrees of motion change is required, and such is generally undetectable and even less (or maybe designed to be) than the inaccuracies of the controller itself. As the player gets very close to the collision, as shown in FIG. 6 below, the partial system control may drop to zero, allowing the player full control of their player avatar. This masks the partial system control, allowing the player full analog control. In the event of a collision, standard techniques such as "collide and slide" may be employed. If no collision is predicted, there is no requirement to adjust the controls.

In the case of FIG. 4 (B), the trajectory 284 of the player avatar 252 is adjusted to a new trajectory 292, which leads to a final position of the player avatar 252 at a position 277. The new trajectory may also be characterized as a new direction of movement or a new player motion. Alternatively, FIG. 4(C) indicates that a final position of the player avatar 252 may be at 277', which position also is away from the avoidance zone. The resolution of the collision avoidance may be determined by aspects such as the angle at which the player avatar 252 is approaching the avoidance zone, the camera facing angle, or other aspects. In particular, in a third step, and as illustrated in FIG. 4(B) and FIG. 4 (C), player intention may be determined by analysis of the position of the stick 278 of the controller 276. In FIG. 4 (B), the stick 278 is pushed in a direction 286, which is generally to the right side of the obstacle 274, and thus the partial system control exerted will tend to move the player avatar 252 to the right, i.e., to the final position 277. By contrast, in FIG. 4 (C), the stick 278 is pushed in a direction 296, which is generally to the left side of the obstacle 274, and notably in an opposite direction to the initial player avatar direction of motion 284, and thus the partial system control exerted will tend to move the player avatar 252 to the left, i.e., to the final position 277'.

In more detail, while adjusting the steering of the player and the player avatar, systems and methods according to present principles may monitor for large or substantial changes in the direction of the stick. If the stick moves against the predicted motion, it may be assumed that the prediction was wrong and the prediction may be flipped to the other side of the avoidance zone. If the stick continues to direct the player avatar consistently, the predicted motion track may be maintained. If the stick moves to a direction that completely avoids the collision, then no partial system control need be exerted, and the systems and methods may simply continue to predict new collisions. If no undesirable collisions are predicted, no adjustments need be made.

Figure 5:
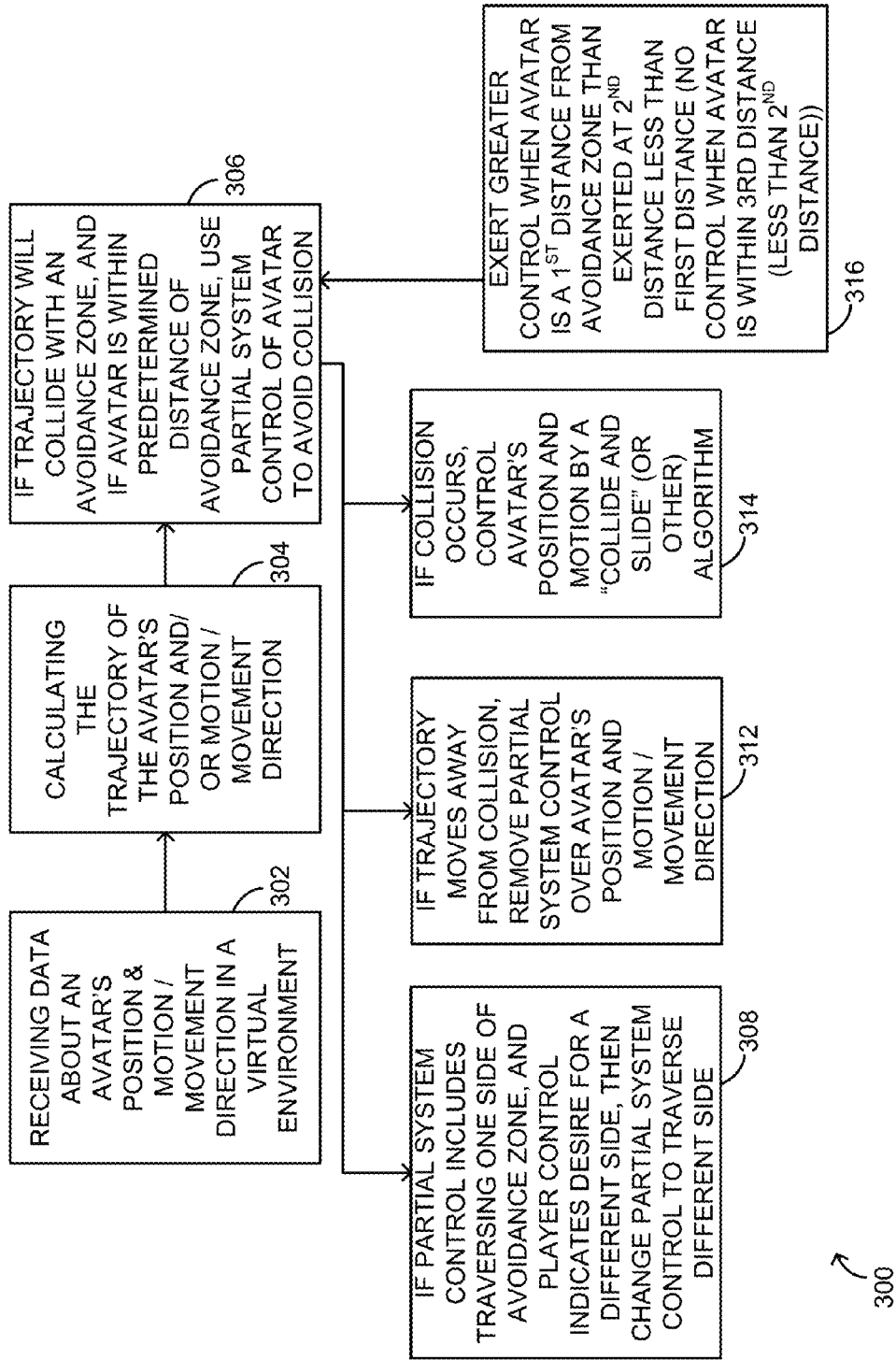
FIG. 5 is a flowchart of an illustrative method by which the present player avatar movement assistance may be implemented.

FIG. 5 is a flowchart 300 describing a method for player avatar movement assistance, e.g., for routing player avatars around or otherwise avoiding areas or volumes identified as avoidance zones. In a first step, data is received about a player avatar's position and their associated motion or movement direction in a virtual environment (step 302). Calculation is then made as to the future positions of the player avatar, e.g., a trajectory is calculated of the avatar's position, which takes into account the motion or movement direction (step 304).

Collision prediction is then performed, with potential partial system control of the player avatar exerted to avoid the collision (step 306). For example, if the trajectory is calculated and the same shows that a current player control of the player avatar will cause the same to collide with an avoidance zone, partial system control may be employed to alter the movement direction of the player avatar to avoid the collision. Such is generally performed only if the avatar is within a predetermined distance of the avoidance zone, although this limitation is not required.

Variations will be seen. For example, if the partial system control includes traversing one side of an avoidance zone, and the player control indicates a desire or intention to traverse the other side, e.g., if the stick direction is opposite to that of the initial traversal proposal, then the partial system control may be altered to exert the control to cause the player avatar to traverse the other side as indicated by the player (step 308). In another variation, if because of player control, partial system control, or both, a trajectory indicates that no collision will occur, then the partial system control may be removed (step 312). In another variation, if a collision occurs, the avatar's position and motion may be resolved by a known algorithm, such as "collide and slide" (step 314). In another variation, greater control may be exerted when an avatar is at a first distance from an avoidance zone as compared to win the avatar is at a second distance (less than the first distance) from the avoidance zone (step 316). In some cases, partial system control may be removed when the avatar is within a third distance from the avoidance zone, which is less than the second distance.

In more detail, as illustrated by the diagram 350 of FIG. 6, if the player avatar 252 is at a first distance 322 from an avoidance zone 258, the level of partial system control 328 exerted of the position and/or motion or movement direction of the player avatar may be larger than the level of partial system control 332 exerted when the player avatar is at a second distance from the avoidance zone 324, the second distance being less than the first distance 322. In this way, the partial system control can ramp down as the avoidance zone is neared, giving the player a greater feeling of control and thus greater player satisfaction. In the metaphor of the online environment, it may be presumed that as the avoidance zone is neared, the player is more likely to have intended to his or her current position relative to the avoidance zone, and thus partial system control is less needed. At a third distance 326 from the avoidance zone, partial system control may be entirely removed, as it may be inferred that the player avatar 252 is being controlled by the player to assume a present position intentionally. In such situations and arrangements, if partial system control were exerted, it may lead to the undesirable result of a player not being able to control their player avatar to a desired position, and thus frustrating the player.

However, it will be understood that in certain implementations, partial system control may always be enabled. For example, such may be enabled to allow novice players to navigate a tortuous or complicated environment more easily, and thus provide a way for novice players to compete with more experienced or expert players, or to allow solo novice players to play a solo game using the same map as used by expert players. The situations and methods of FIGS. 7 and 8 may be employed for similar purposes.

Figure 7:
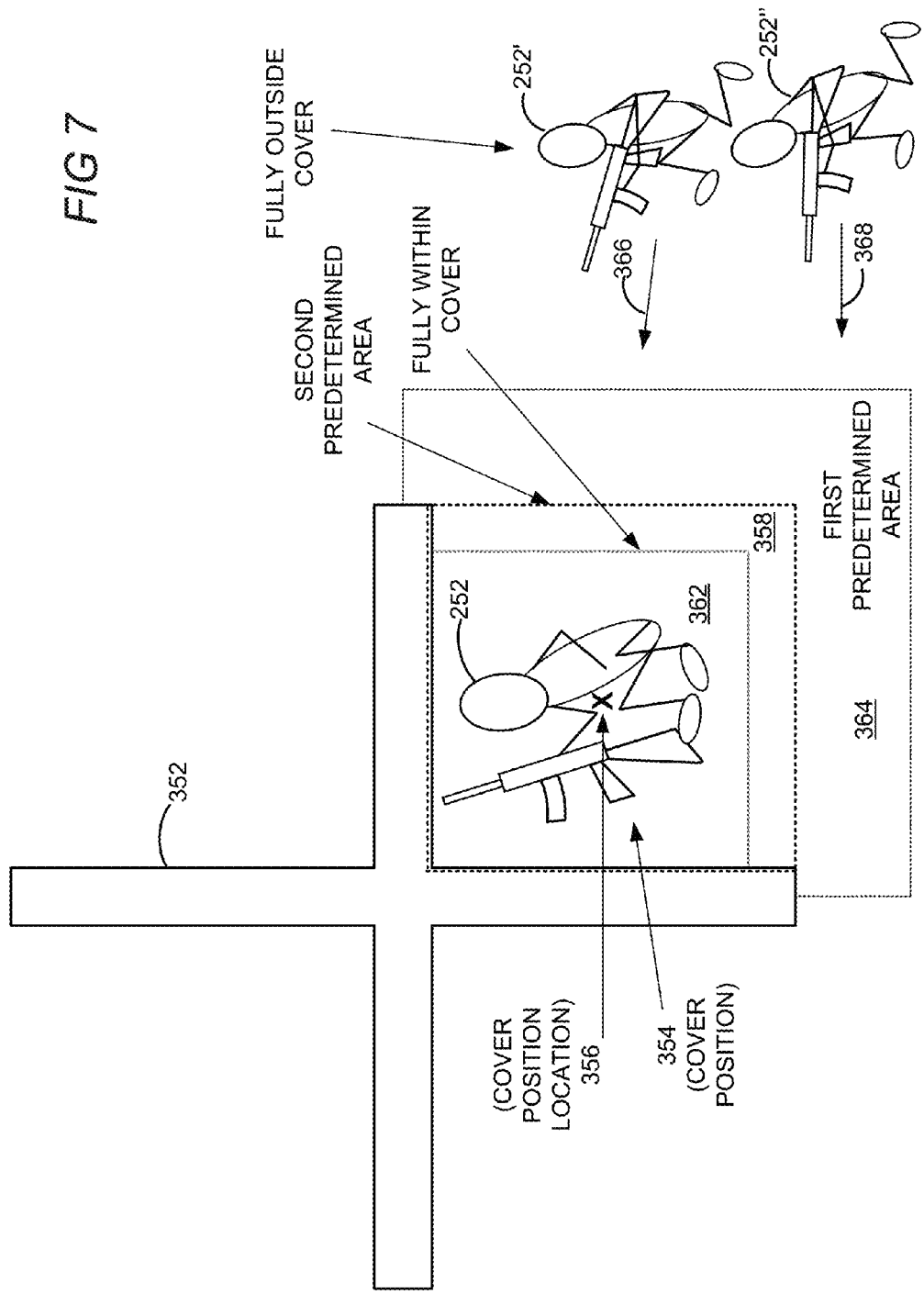
FIG. 7 illustrates another exemplary situation in which an arrangement of the system and method according to present principles may be implemented.

Referring to FIG. 7, a situation is illustrated for an alternative implementation of player avatar movement assistance. In this situation, a player avatar 252 is shown taking cover behind an obstacle 352. In particular, the player avatar 252 is being controlled to occupy the cover position 354, the cover position being associated in some arrangements with a particular area or volume in which damage to the player avatar is minimized or prohibited. Depending on the position of the player avatar, the same may be fully in the cover position (shown in FIG. 7 as being within the rectangle 362), fully outside of the cover position (shown, e.g., as the position of player avatars 252' and 252"), or may be partially in the cover position and partially outside of the cover position (not shown). In certain arrangements contemplated here, it may be undesirable for a player avatar to be partially in-cover and partially out-of-cover, as a player then does not know if the player avatar is capable of taking damage.

Associated with the cover position 354 may be a cover position location 356, from which distances to the cover position may be calculated. The cover position location 356 is shown in the approximate location where the player avatar 252 is located, but it will be understood that, depending on application, it may take a number of different positions, including at a geometric center of the obstacle 352.

If the player avatar is within a certain distance from the cover position 354, e.g., within a certain distance from the cover position location 356, partial system control may be exerted to move the player avatar to fully occupy the cover position 354, e.g., to move the player avatar within the area or volume 362.

Variations will be understood. For example, if the player avatar is within a first predetermined area 364, and a player intention is determined that the player avatar is intended to occupy the cover position, then the partial system control may be exerted to move the player avatar into the cover position, e.g., by adjustment of its position, motion, movement direction, or a combination of these. For example, the player avatar 252' is shown moving in a direction 366 which is generally towards the cover position. The stick position on a controller may indicate such a direction of movement. The player intention controlling player avatar 252' may thus be determined to be that the player avatar 252' is to occupy the cover position, and the partial system control appropriately exerted, e.g., once the player avatar 252' is within the first predetermined area 364. By contrast, the player avatar 252" is also moving towards the first predetermined area 364, and a current trajectory of the same will indicate an intersection with the area 364. However, the player avatar 252" is being controlled to move in a direction 368 which is not towards the cover position. Accordingly, arrangements according to present principles may determine that the player is not controlling the player avatar 252" to occupy the cover position, and no partial system control may be exerted, or the same may be diverted from the cover position.

In some cases, the player avatar may be so close to the cover position, e.g., within a second predetermined area 358, that it may be assumed the player avatar is intended to fully occupy the cover position, no matter a current motion or movement direction. In such cases, partial system control may be exerted to move the player avatar into the "fully within cover" area or volume 362.

Figure 8:
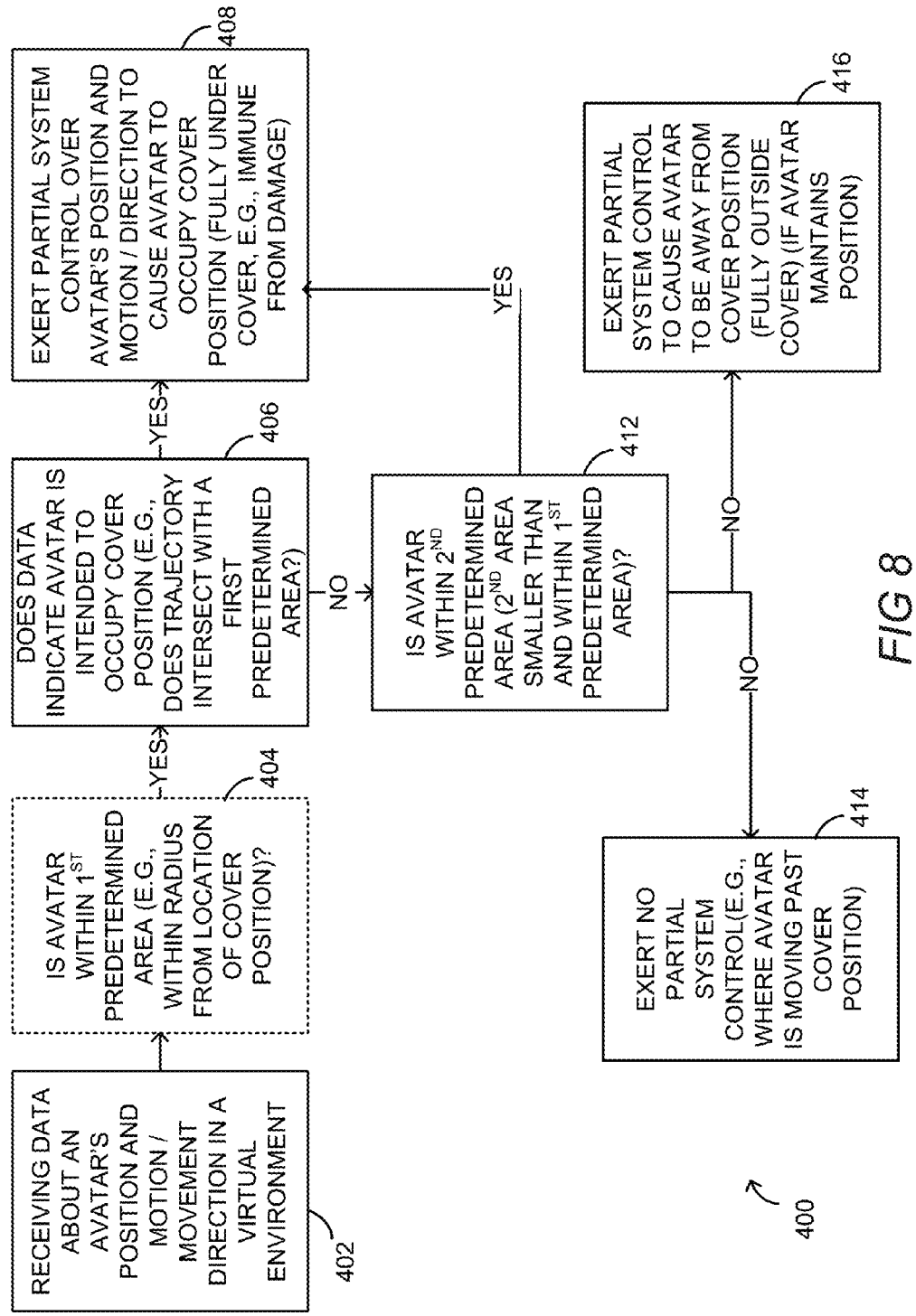
FIG. 8 is a flowchart of another illustrative method by which the present player avatar movement assistance may be implemented.

FIG. 8 is a flowchart 400 illustrating a method of player avatar movement assistance, in particular with respect to cover positions. In a first step, data is received about a player avatar's position and motion or movement direction in a virtual environment (step 402). A determination is made as to whether the position and motion or movement direction indicate that the player avatar is intended to occupy a cover position. As part of this determination, aoptional calculation may be made as to whether the player avatar is within a first predetermined area from the cover position (step 404), which may include determining a distance of the avatar from a location of the cover position. Also as part of the determination, a trajectory may be calculated and a determination made as to whether the trajectory intersects with the first predetermined area. If the determination is such that the data indicates the player avatar is intended to occupy the cover position (step 406), then partial system control may be exerted over the player avatar's position and motion or movement direction to cause the player avatar to fully occupy the cover position (step 408). In this way, the player avatar receives minimized or no damage, in compliance with the player expectations during cover situations.

A calculation may also be made as to whether the player avatar is within a second predetermined area, where the second predetermined area may be smaller than and within the first predetermined area (step 412). In such situations, the motion or movement direction of the player avatar may be immaterial, and it may be assumed that player intends to occupy the cover position. The partial system control (step 408) may be exerted accordingly.

For player avatars that are not within the second predetermined area, or for which a player intention has been determined to be such that the player avatar is not intended to occupy the cover position, partial system control may be either unexerted (step 414), which may be particularly appropriate where a player avatar motion or direction indicates the avatar is simply passing by a cover position, or the partial system control may specifically cause the player avatar to be fully outside of the cover position (step 416), which may be particularly appropriate if the player avatar is maintaining a position near the cover position, and not just passing by it.

Particular systems which may implement player avatar movement assistance are now described.

Figure 9:
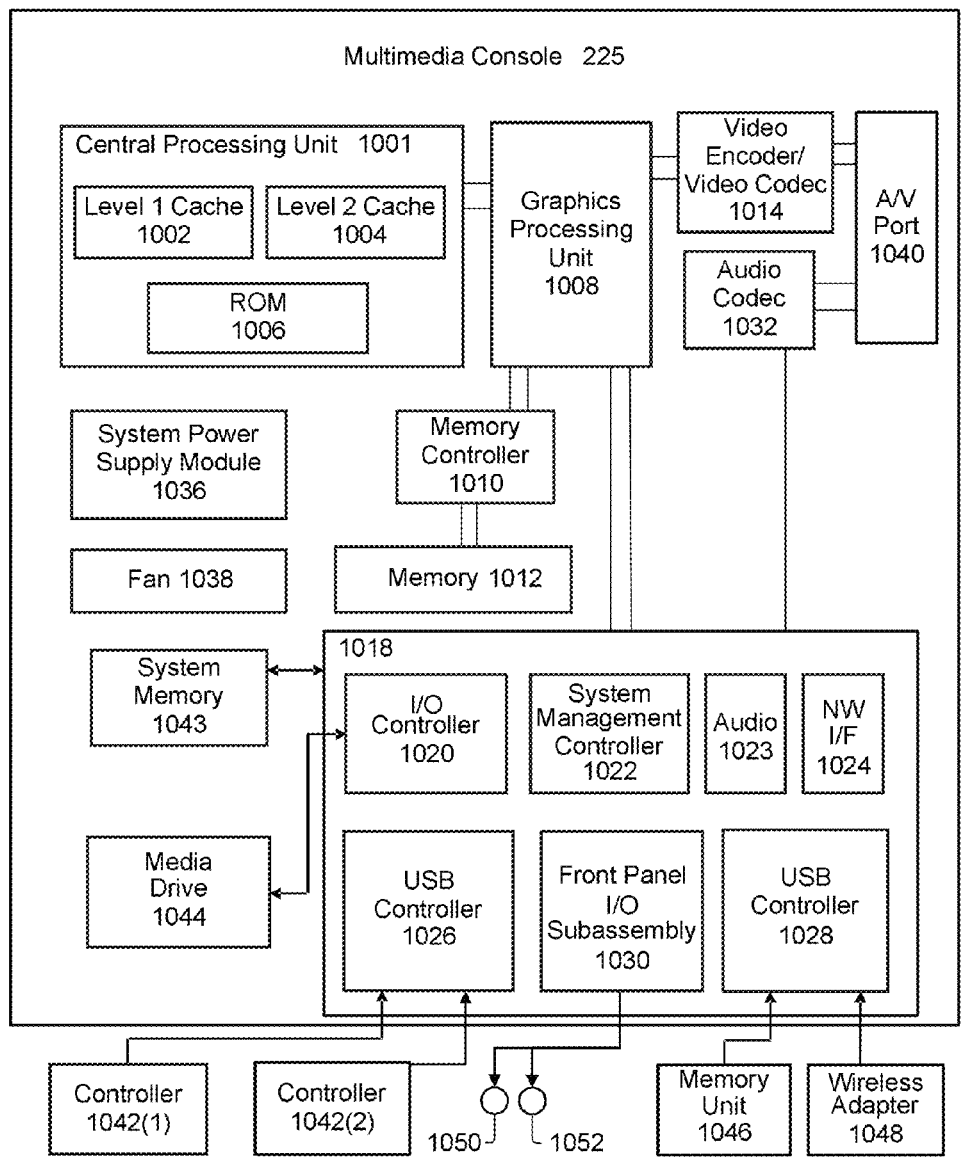
FIG. 9 is an illustrative functional block diagram of a multimedia console.

FIG. 9 is an illustrative functional block diagram of the multimedia console 225 shown in FIG. 2. As shown in FIG. 9, the multimedia console 225 has a central processing unit (CPU) 1001 having a level 1 cache 1002, a level 2 cache 1004, and a Flash ROM (Read Only Memory) 1006. The level 1 cache 1002 and the level 2 cache 1004 temporarily store data and hence reduce the number of memory access cycles, thereby improving processing speed and throughput. The CPU 1001 may be configured with more than one core, and thus, additional level 1 and level 2 caches 1002 and 1004. The Flash ROM 1006 may store executable code that is loaded during an initial phase of a boot process when the multimedia console 225 is powered ON.

A graphics processing unit (GPU) 1008 and a video encoder/video codec (coder/decoder) 1014 form a video processing pipeline for high speed and high resolution graphics processing. Data is carried from the GPU 1008 to the video encoder/video codec 1014 via a bus. The video processing pipeline outputs data to an A/V (audio/video) port 1040 for transmission to a television or other display. A memory controller 1010 is connected to the GPU 1008 to facilitate processor access to various types of memory 1012, such as, but not limited to, a RAM.

The multimedia console 225 includes an I/O controller 1020, a system management controller 1022, an audio processing unit 1023, a network interface controller 1024, a first USB (Universal Serial Bus) host controller 1026, a second USB controller 1028, and a front panel I/O subassembly 1030 that are preferably implemented on a module 1018. The USB controllers 1026 and 1028 serve as hosts for peripheral controllers 1042(1)-1042(2), a wireless adapter 1048, and an external memory device 1046 (e.g., Flash memory, external CD/DVD ROM drive, removable media, etc.). The network interface controller 1024 and/or wireless adapter 1048 provide access to a network (e.g., the Internet, home network, etc.) and may be any of a wide variety of various wired or wireless adapter components including an Ethernet card, a modem, a Bluetooth module, a cable modem, or the like.

System memory 1043 is provided to store application data that is loaded during the boot process. A media drive 1044 is provided and may comprise a DVD/CD drive, hard drive, or other removable media drive, etc. The media drive 1044 may be internal or external to the multimedia console 225. Application data may be accessed via the media drive 1044 for execution, playback, etc. by the multimedia console 225. The media drive 1044 is connected to the I/O controller 1020 via a bus, such as a Serial ATA bus or other high speed connection (e.g., IEEE 1394).

The system management controller 1022 provides a variety of service functions related to assuring availability of the multimedia console 225. The audio processing unit 1023 and an audio codec 1032 form a corresponding audio processing pipeline with high fidelity and stereo processing. Audio data is carried between the audio processing unit 1023 and the audio codec 1032 via a communication link. The audio processing pipeline outputs data to the A/V port 1040 for reproduction by an external audio player or device having audio capabilities.

The front panel I/O subassembly 1030 supports the functionality of the power button 1050 and the eject button 1052, as well as any LEDs (light emitting diodes) or other indicators exposed on the outer surface of the multimedia console 225. A system power supply module 1036 provides power to the components of the multimedia console 225. A fan 1038 cools the circuitry within the multimedia console 225.

The CPU 1001, GPU 1008, memory controller 1010, and various other components within the multimedia console 225 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 225 is powered ON, application data may be loaded from the system memory 1043 into memory 1012 and/or caches 1002 and 1004 and executed on the CPU 1001. The application may present a graphical user interface that provides a consistent user experience when navigating to different media types available on the multimedia console 225. In operation, applications and/or other media contained within the media drive 1044 may be launched or played from the media drive 1044 to provide additional functionalities to the multimedia console 225.

The multimedia console 225 may be operated as a standalone system by simply connecting the system to a television or other display. In this standalone mode, the multimedia console 225 allows one or more users to interact with the system, watch movies, or listen to music. However, with the integration of broadband connectivity made available through the network interface controller 1024 or the wireless adapter 1048, the multimedia console 225 may further be operated as a participant in a larger network community.

When the multimedia console 225 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 225 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 1001 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 1042(1) and 1042(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Figure 10:
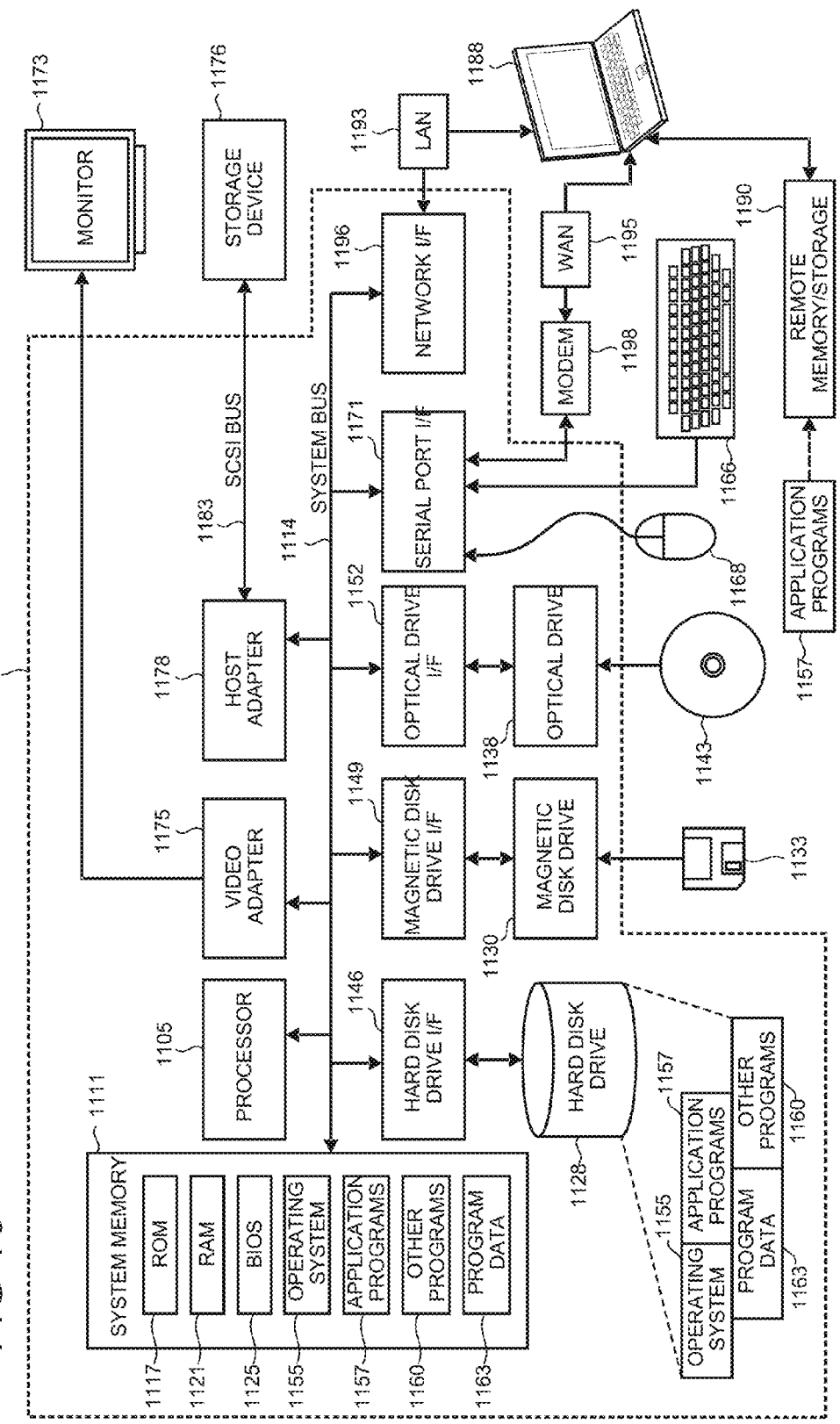
FIG. 10 is a simplified block diagram of an illustrative computer system such as a personal computer ("PC") that may be used in part to implement the present player avatar movement assistance.

FIG. 10 is a simplified block diagram of an illustrative computer system 1100 such as a PC, client device, or server with which the present player avatar movement assistance may be implemented. Computer system 1100 includes a processing unit 1105, a system memory 1111, and a system bus 1114 that couples various system components including the system memory 1111 to the processing unit 1105. The system bus 1114 may be any of several types of bus structures including a memory bus or memory controller, a peripheral bus, and a local bus using any of a variety of bus architectures. The system memory 1111 includes read only memory ("ROM") 1117 and random access memory ("RAM") 1121. A basic input/output system ("BIOS") 1125, containing the basic routines that help to transfer information between elements within the computer system 1100, such as during startup, is stored in ROM 1117. The computer system 1100 may further include a hard disk drive 1128 for reading from and writing to an internally disposed hard disk (not shown), a magnetic disk drive 1130 for reading from or writing to a removable magnetic disk 1133 (e.g., a floppy disk), and an optical disk drive 1138 for reading from or writing to a removable optical disk 1143 such as a CD (compact disc), DVD (digital versatile disc), or other optical media. The hard disk drive 1128, magnetic disk drive 1130, and optical disk drive 1138 are connected to the system bus 1114 by a hard disk drive interface 1146, a magnetic disk drive interface 1149, and an optical drive interface 1152, respectively. The drives and their associated computer readable storage media provide non-volatile storage of computer readable instructions, data structures, program modules, and other data for the computer system 1100. Although this illustrative example shows a hard disk, a removable magnetic disk 1133, and a removable optical disk 1143, other types of computer readable storage media which can store data that is accessible by a computer such as magnetic cassettes, flash memory cards, digital video disks, data cartridges, random access memories ("RAMs"), read only memories ("ROMs"), and the like may also be used in some applications of the present player avatar movement assistance. In addition, as used herein, the term computer readable storage medium includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 1133, optical disk 1143, ROM 1117, or RAM 1121, including an operating system 1155, one or more application programs 1157, other program modules 1160, and program data 1163. A user may enter commands and information into the computer system 1100 through input devices such as a keyboard 1166 and pointing device 1168 such as a mouse. Other input devices (not shown) may include a microphone, joystick, game pad, satellite dish, scanner, trackball, touchpad, touch screen, touch-sensitive module or device, gesture-recognition module or device, voice recognition module or device, voice command module or device, or the like. These and other input devices are often connected to the processing unit 1105 through a serial port interface 1171 that is coupled to the system bus 1114, but may be connected by other interfaces, such as a parallel port, game port, or USB. A monitor 1173 or other type of display device is also connected to the system bus 1114 via an interface, such as a video adapter 1175. In addition to the monitor 1173, personal computers typically include other peripheral output devices (not shown), such as speakers and printers. The illustrative example shown in FIG. 10 also includes a host adapter 1178, a Small Computer System Interface ("SCSI") bus 1183, and an external storage device 1176 connected to the SCSI bus 1183.

The computer system 1100 is operable in a networked environment using logical connections to one or more remote computers, such as a remote computer 1188. The remote computer 1188 may be selected as another personal computer, a server, a router, a network PC, a peer device, or other common network node, and typically includes many or all of the elements described above relative to the computer system 1100, although only a single representative remote memory/storage device 1190 is shown in FIG. 10. The logical connections depicted in FIG. 10 include a local area network ("LAN") 1193 and a wide area network ("WAN") 1195. Such networking environments are often deployed, for example, in offices, enterprise-wide computer networks, intranets, and the Internet.

Figure 11:
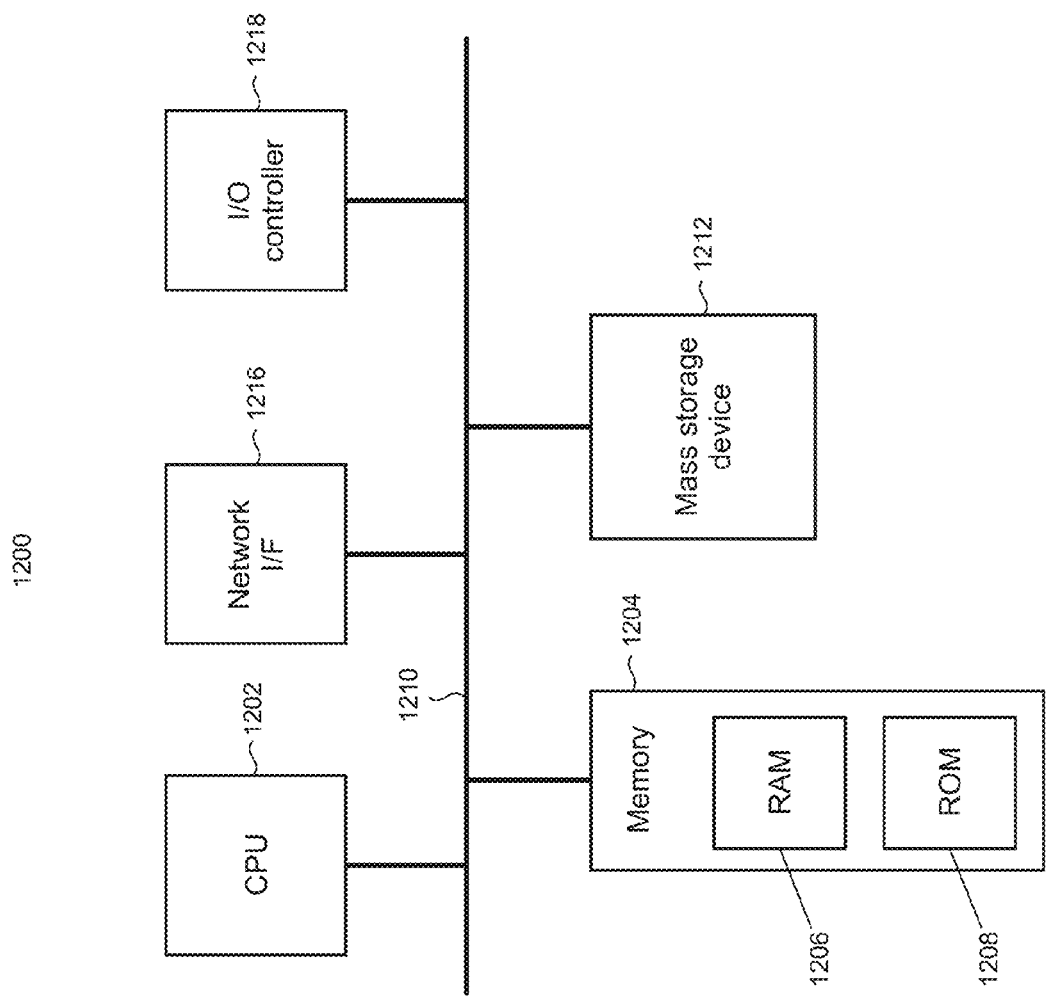
FIG. 11 shows a block diagram of an illustrative computing platform that may be used in part to implement the present player avatar movement assistance.

When used in a LAN networking environment, the computer system 1100 is connected to the local area network 1193 through a network interface or adapter 1196. When used in a WAN networking environment, the computer system 1100 typically includes a broadband modem 1198, network gateway, or other means for establishing communications over the wide area network 1195, such as the Internet. The broadband modem 1198, which may be internal or external, is connected to the system bus 1114 via a serial port interface 1171. In a networked environment, program modules related to the computer system 1100, or portions thereof, may be stored in the remote memory storage device 1190. It is noted that the network connections shown in FIG. 10 are illustrative and other means of establishing a communications link between the computers may be used depending on the specific requirements of an application of player avatar movement assistance. It may be desirable and/or advantageous to enable other types of computing platforms other than the multimedia console 225 to implement the present player avatar movement assistance in some applications. For example, a player avatar movement assistance client may be readily adapted to run on various fixed computing platforms and mobile computing platforms. FIG. 11 shows an illustrative architecture 1200 for a computing platform or device capable of executing the various components described herein for player avatar movement assistance. Thus, the architecture 1200 illustrated in FIG. 11 shows an architecture that may be adapted for a server computer, mobile phone, a PDA (personal digital assistant), a smartphone, a desktop computer, a netbook computer, a tablet computer, GPS (Global Positioning System) device, gaming console, and/or a laptop computer. The architecture 1200 may be utilized to execute any aspect of the components presented herein.

The architecture 1200 illustrated in FIG. 11 includes a CPU 1202, a system memory 1204, including a RAM 1206 and a ROM 1208, and a system bus 1210 that couples the memory 1204 to the CPU 1202. A basic input/output system containing the basic routines that help to transfer information between elements within the architecture 1200, such as during startup, is stored in the ROM 1208. The architecture 1200 further includes a mass storage device 1212 for storing software code or other computer-executed code that is utilized to implement applications, the file system, and the operating system.

The mass storage device 1212 is connected to the CPU 1202 through a mass storage controller (not shown) connected to the bus 1210. The mass storage device 1212 and its associated computer-readable storage media provide non-volatile storage for the architecture 1200. Although the description of computer-readable storage media contained herein refers to a mass storage device, such as a hard disk or CD-ROM drive, it should be appreciated by those skilled in the art that computer-readable media can be any available computer storage media that can be accessed by the architecture 1200.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), BLU-RAY, or other optical storage, magnetic cassettes, magnetic tape, magnetic disk storage or other magnetic storage devices, or any other medium which can be used to store the desired information and which can be accessed by the architecture 1200.

According to various embodiments, the architecture 1200 may operate in a networked environment using logical connections to remote computers through a network. The architecture 1200 may connect to the network through a network interface unit 1216 connected to the bus 1210. It should be appreciated that the network interface unit 1216 also may be utilized to connect to other types of networks and remote computer systems. The architecture 1200 also may include an input/output controller 1218 for receiving and processing input from a number of other devices, including a keyboard, mouse, or electronic stylus (not shown in FIG. 11). Similarly, the input/output controller 1218 may provide output to a display screen, a printer, or other type of output device (also not shown in FIG. 11).

It should be appreciated that the software components described herein may, when loaded into the CPU 1202 and executed, transform the CPU 1202 and the overall architecture 1200 from a general-purpose computing system into a special-purpose computing system customized to facilitate the functionality presented herein. The CPU 1202 may be constructed from any number of transistors or other discrete circuit elements, which may individually or collectively assume any number of states. More specifically, the CPU 1202 may operate as a finite-state machine, in response to executable instructions contained within the software modules disclosed herein. These computer-executable instructions may transform the CPU 1202 by specifying how the CPU 1202 transitions between states, thereby transforming the transistors or other discrete hardware elements constituting the CPU 1202.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 1200 in order to store and execute the software components presented herein. It also should be appreciated that the architecture 1200 may include other types of computing devices, including hand-held computers, embedded computer systems, smartphones, PDAs, and other types of computing devices known to those skilled in the art. It is also contemplated that the architecture 1200 may not include all of the components shown in FIG. 11, may include other components that are not explicitly shown in FIG. 11, or may utilize an architecture completely different from that shown in FIG. 11.

Based on the foregoing, it should be appreciated that technologies for player avatar movement assistance have been disclosed herein. Although the subject matter presented herein has been described in language specific to computer structural features, methodological and transformative acts, specific computing machinery, and computer readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

The invention claimed is:

1. A method for assisting player avatar movement in a virtual environment, comprising:
  a. receiving data about a player avatar's position and motion in a virtual environment, the virtual environment including at least one avoidance zone, the avoidance zone associated with a predetermined distance, the player avatar's position and motion at least partially controlled by a player;

b. calculating a trajectory of the player avatar's position and motion; and c. if the trajectory indicates the player avatar will collide with the avoidance zone, and if the player avatar is within the predetermined distance, then exerting partial system control over the player avatar's position or motion, along with the player, to cause the calculated trajectory to not collide with the avoidance zone, wherein the exerting partial system control includes exerting a greater amount of control when the player avatar is at a first distance from the avoidance zone and a lesser amount of control, but still partial system control, when the player avatar is at a second distance from the avoidance zone, the second distance less than the first distance.

2. The method of claim 1, further comprising exerting no system control when the player avatar is at a third distance from the avoidance zone, the third distance less than the second distance.

3. The method of claim 1, wherein if the combination of the player avatar's position and motion as controlled by a player and the partial system control exerted is such that the player avatar collides with the avoidance zone, then controlling the player avatar's resulting position and motion by a "collide and slide" algorithm.

4. The method of claim 1, wherein, after the exerting, if a trajectory is calculated that indicates the player avatar will not collide with the avoidance zone, then further comprising removing the partial system control.

5. The method of claim 1, wherein the trajectory is caused to not collide with the avoidance zone by traversing a path around one side of the avoidance zone, and further comprising:

a. receiving a player control indicating a desire to traverse a path around an opposite side of the avoidance zone; and b. exerting partial system control over the player avatar's position or motion, along with the player, to cause the trajectory to not collide with the avoidance zone by traversing the path around the opposite side of the avoidance zone.

6. The method of claim 5, wherein the player control is received from a joystick.

7. The method of claim 1, wherein the virtual environment is a massive multiplayer online game.

8. The method of claim 1, wherein the trajectory is caused to not collide with the avoidance zone by traversing a first path to avoid the avoidance zone, and further comprising:

a. receiving a player control indicating a desire to traverse a second path to avoid the avoidance zone, the second path different than the first path; and b. exerting partial system control over the player avatar's position or motion, along with the player, to cause the trajectory to not collide with the avoidance zone by traversing the second path to avoid the avoidance zone.

9. One or more computer readable storage media storing instructions which, when executed by one or more processors an electronic device, perform a method for implementing player avatar assistance movement in a virtual environment, comprising:

a. in an online environment in which one or more player avatars are controlled by users, the online environment including at least one obstacle around which player avatars maneuver, a portion of the obstacle defining at least one avoidance zone, determining from a player avatar position and movement direction data, controlled by the user using a user interface, whether the player avatar is moving towards the avoidance zone in the virtual environment; and b. if the determination is that the player avatar is moving towards the avoidance zone, then altering the player avatar movement direction data or position or both, as the player avatar moves toward the avoidance zone, such that the player avatar is deflected away from the avoidance zone, and such that the level of altering is decreased as a distance between the player avatar and the avoidance zone decreases.

10. A method for assisting player avatar movement in a virtual environment, comprising:

a. receiving data about a player avatar's position and motion in a virtual environment, the virtual environment including at least one cover position, the cover position associated with a first predetermined area, the player avatar's position and motion at least partially controlled by a player; and b. if the player avatar's position and motion indicates that the player avatar is being controlled to occupy the cover position and if the player avatar's position is within the first predetermined area, or if the player avatar's position is within a second predetermined area smaller than and within the first predetermined area, then exerting partial system control over the player avatar's position or motion, along with the player, to cause the player avatar to occupy the cover position.

11. The method of claim 10, wherein the exerting partial system control to cause the player avatar to occupy the cover position includes causing the player avatar to be fully within the cover position.

12. The method of claim 11, further comprising if the player avatar's position and motion indicates that the player avatar is not being controlled to occupy the cover position, then exerting partial system control to cause the player avatar to be fully outside of the cover position.

13. The method of claim 11, further comprising if the player avatar's position and motion indicates that the player avatar is not being controlled to occupy the cover position, then removing the exertion of partial system control.

14. The method of claim 11, wherein when the player avatar is fully within a cover, the player avatar is immune from damage or receives minimized damage.

15. The method of claim 11, wherein if the player avatar's position and motion indicates the player avatar is not being controlled to occupy the cover position, and if the player avatar is not within the second predetermined area, then causing the player avatar to be fully outside of the cover position.

16. The method of claim 10, wherein the cover position is associated with a location in the virtual environment, and the first predetermined area is associated with an area or volume within a predetermined radius from the location.

17. The method of claim 10, wherein the player avatar's position and motion indicates that the player avatar is being controlled to occupy the cover position when a trajectory associated with the player avatar's position and motion intersects with the second predetermined area, or when the player avatar is facing the cover position or is facing the second predetermined area.

18. The method of claim 10, wherein the player avatar's position and motion indicates that the player avatar is being controlled to occupy the cover position when the player avatar is facing the cover position or is facing the second predetermined area.

19. The method of claim 10, wherein the online environment is a massive multiplayer online game.

* * * * *